3,375,086
HYDRAZINATED LITHIUM BOROHYDRIDES
AND PREPARATION THEREOF
Frank C. Gunderloy, Jr., Menlo Park, N.J., assignor to Esso Research and Engineering Company, a corporation of Delaware
No Drawing. Filed Oct. 30, 1959, Ser. No. 851,188
7 Claims. (Cl. 23—358)

The present invention relates to borohydride compounds and their preparation. One aspect of the invention relates to the preparation of bis-hydrazine lithium borohydride by reacting hydrazine with lithium borohydride. Another aspect of the invention concerns making bis-hydrazinemonoborane lithium borohydride from hydrazineborane and lithium borohydride.

Hydrazine and its derivatives are known to react with organic oxygen-containing compounds, e.g. aldehydes, to produce valuable chemicals. For instance, phenyl hydrazine reacts with benzaldehyde to make benzaldehyde phenylhydrazone. Hydrazine has been used as a rocket fuel and recently it has been disclosed that hydrazineborane is a suitable monopropellant. From the foregoing, it is apparent that hydrazine compounds are important not only in organic preparation but also in the propellant field.

It has now been discovered that hydrazine lithium borohydrides can simply and economically be prepared and that these compounds are not only outstanding chemical agents, but also they are useful as fuels in pure rockets.

The hydrazine lithium borohydrides of the present invention have the following generic formula:

$$LIBH_4[H_2NNH_2(BH_3)_x]_2$$

wherein each symbol has its common chemical meaning except of course $x$ which is an integer between 0 and 1. The two compounds coming within this formula may be described in chemical nomenclature as bis-hydrazine lithium borohydride and bis-hydrazinemonoborane lithium borohydride and their respective empirical formulars are:

(1)                $LiH_{12}N_4B$
(2)                $LiH_{18}N_4B_3$

These substances may also be described as lithium borohydride dihydrazinate and lithium borohydride dihydrazinemonoborane.

The foregoing borohydrides are readily prepared at ambient temperature and atmospheric pressure from hydrazine or hydrazineborane and lithium borohydride. In the reaction involving hydrazine and lithium borohydride it is not necessary to employ a liquid solvent or diluent because hydrazine provides a suitable medium by itself. In the case of the hydrazinemonoborane, which is a solid, it is highly desirable to use a liquid which will not cause the hydrazinemonoborane to decompose and which will not react with the reaction product. The preferred solvent is tetrahydrofuran which is a saturated cyclic organic ether. Another suitable organic ether solvent is dihydropyran.

The reaction temperature is not critical, the only requirement being that it be sufficiently low to permit the recovery of a substantial amount of the reaction product. The hydrazine alkali metal borohydrides prepared by the abovedescribed process are sensitive to high temperatures and commence to decompose under severe conditions. For this reason, it is recommended that the reaction temperature be not greater than 100° C. and preferably not higher than 50° C. Of course, it is assumed that one skilled in the art will employ adequate pressure at the higher temperatures to prevent the loss of solvent or reactants. Thus, it may be necessary to employ pressures of 10 to 20 atmospheres or more at higher temperatures. Insofar as low reaction temperatures are concerned, the only limitation here is that the reaction mixture should not be so cold as to freeze the mixture and prevent adequate contact of the reactants. A suitable lower temperature is about 0 to 5° C. and the preferred reaction temperature range is 0 to 50° C., with room temperature being especially preferred, mainly for economic reasons, where the reaction does not result in the formation of large amounts of heat.

Generally, about 2 to 20 moles of hydrazine or hydrazinemonoborane is contacted with 1 mole of lithium borohydride in a suitable vessel under anhydrous conditions. While stoichimetric amounts of the reactants may be employed, it is advisable to use an excess of the hydrazine or hydrazinemonoborane in the reaction mixture, e.g. 1 to 1000% excess. An excess of hydrazine is particularly useful in those reactions in which it is also the solvent. It is essential to use anhydrous reactants and solvents in carrying out the reaction since the presence of even traces of water can cause the reaction product to decompose. Both reaction products are very hygroscopic and must be maintained in a dry inert atmosphere. Oxygen is also an undesirable impurity in the reaction zone and it is necessary to employ an inert gas, such as nitrogen or helium in order to avoid the deleterious action of oxygen.

The reaction of lithium borohydride and hydrazine is exothermic and in the absence of cooling or the use of a solvent, such as tetrahydrofuran, foaming will occur when the reactants are mixed. Thus, with regard to this reaction, it is desirable to employ refrigeration to maintain the temperature of the reaction mixture at about 0 to 15° C. This difficulty is usually not encountered in the reaction of hydrazinemonoborane with lithium borohydride because the solvent assists in the dissipation of any heat which may be formed. The amount of solvent employed in either reaction is not critical, however, sufficient solvent should be used to obtain a homogeneous mixture of the reactants in the reaction zone. The use of about 10 to 1000 parts by weight of tetrahydrofuran or other suitable solvent, e.g. a $C_4$ to $C_5$ cyclic ether, is recommended for each part by weight of the reactants. The reactants may be admixed with or dissolved in a part or all of the solvent prior to introducing them into the reaction zone which should comprise a vessel made of or lined with an inert material, such as glass.

Of course, the reactants should be substantially anhydrous and, in addition to this requirement, it is preferred that they be essentially free of other impurities. While it has been found that lithium borohydride which is substantially pure, e.g. about 90% pure, is satisfactory, it is more desirable to use very pure material, or at least to remove the insoluble impurities in the borohydride reactant since these impurities will contaminate the solid product.

The reaction products are solids at room temperature and are therefore easily recovered from the reaction mixture by conventional chemical techniques. For instance, in the case of the reaction product of hydrazinemonoborane and lithium borohydride, the reaction mixture may be warmed to evaporate most of the ether solvent and then the concentrated mixture may be admixed with a hydrocarbon diluent, such as benzene, which causes the precipitation of the aduct formed during the reaction. The precipitate may be filtered and washed with additional hydrocarbon diluent and then dried under vacuum at room temperature. Among the $C_1$ to $C_{12}$ aromatic and paraffinic hydrocarbon diluents which may be used to precipitate the reaction product are benzene, toluene, hexane and decane.

If, as in the case of the reaction of lithium borohydride with hydrazine, no solvent is used the reaction product may be recovered by evaporating the excess hydrazine from the mixture and drying the residue. In this process the yields are substantially quantitative.

The hydrazinated lithium borohydride of the present invention are highly useful in rocket propellant systems because they contain large amounts of hydrogen which provides a driving substance for the rocket. They have relatively high melting points which in this respect makes them more attractive than say hydrazinemonoborane which is somewhat less stable. Of course, they are very hygroscopic and must be maintained in a substantially water free atmosphere. They may be used either as monopropellants or in admixture with other fuels and an oxidizing agent, such as nitronium perchlorate or hydrogen peroxide. Aside from their usefulness in propellants, they are excellent reducing agents for aldehydes and ketones. For example, they can be used to reduce cyclopentanone to produce large yields of cyclopentanol. Other uses for these compounds are known to those skilled in the borohydride art since these substances behave in an analogous manner to other borohydride compounds.

The following examples are provided to illustrate how the compounds of the present invention may be prepared:

EXAMPLE 1

Bis-hydrazine lithium borohydride was prepared by dissolving 0.33 gram of 91.6% pure lithium borohydride in 10 cc. of anhydrous hydrazine under a dry nitrogen atmosphere with stirring. It was noted that during the addition of the borohydride an exothermic reaction occured as indicated by the formation of foam and an increase in the temperature of the reaction mixture. When the foaming subsided after the addtiion of all of the lithium borohydride, the reaction mixture was filtered and the liquid in the reaction mixture was permitted to evaporate overnight at room temperature under a stream of nitrogen. Thereafter the residue was dried under vacuum (ca. 0.01– 0.2 mm. of mercury) for 48 hours at room temperature. The reaction product recovered weighed 1.2 grams which is equal to the theoretical yield.

EXAMPLE 2

In another run the compound prepared in Example 1 was made at a lower temperature. In this preparation, 0.6 gram of lithium borohydride was slowly added to 10 cc. of chilled (about 5° C.) hydrazine with stirring. The reaction zone was protected with a dry nitrogen atmosphere. It was noted that the addition of the lithium borohydride was not accompanied with the foaming noted in the previous example. After all of the lithium borohydride had been added to the reaction mixture, the mixture was evaporated under a stream of nitrogen at room temperature. The residue recovered, which consisted of glassy crystals in a thick liquid, was dried under vacuum for 24 hours and a white solid was recovered. The yield was substantially quantitative.

The reaction product was analyzed for lithium, boron, nitrogen and hydrogen and the data obtained are given in Table I.

Table I

Calculated for $LiBH_4(H_2NNH_2)_2$: Li, 8.1%; B, 12.6%; N, 65.2%; H, 14.1%. Found: Li, 7.97%; B, 12.68%; N, 61.26%; 66.37%; H, 15.48%; 13.28%.

The white solid product had a density of 0.96 gm./cm. its heat of formation was estimated to be $-36$ kcal./mole and it had a melting point (sealed capillary-instant immersion) of 115° C.

EXAMPLE 3

Bis-hydrazine monoborane lithium borohydride was prepared by dissolving 0.13 gram of 91.6% pure lithium borohydride in 10 cc. of anhydrous tetrahydrofuran, filtering the resulting solution to remove solid impurities, washing the solid residue with 5 cc. of tetrahydrofuran and then adding the filtrate and washings to 0.4 gram of hydrazinemonoborane in 25 cc. of anhydrous tetrahydrofuran. All of the foregoing steps were carried out under a nitrogen atmosphere. After mixing the hydrazine monoborane with the lithium borohydride, the reaction mixture was allowed to stand for 24 hours. It was noted that while the solution was clear immediately after the reactants were mixed, it later became faintly yellow. After standing for a day at room temperature, the reaction mixture was concentrated to 5 cc. by evaporation under nitrogen and diluted with 125 cc. of anhydrous benzene. At this point the adduct precipitated and the precipitate formed was rapidly filtered and washed with additional benzene. A dry nitrogen atmosphere was maintained throughout the process. The washed precipitate was then vacuum dried at room temperature and 0.45 gram of product (79% of the theoretical yield) was obtained.

The reaction product was analyzed and the analytical data obtained are found in Table II:

Table II

Calculated for $LiBH_4(H_2NNH_2 \cdot BH_3)_2$: B, 28.57%; N, 49.68%. Found: B, 28.51%; N, 49.34%.

The light yellow solid product had a density of approximately 0.95 gm./cm.$^3$ and a heat of formation of $-72$ kcal./mole. It did not have a sharp melting point but rather began to collapse at 71° C. and decomposed at 73° C. It is believed that the light yellow color may be due to a trace of impurity in the product.

EXAMPLE 4

Example 3 was repeated using twice the amount of reactants and a total of 50 cc. of anhydrous tetrahydrofuran. The yield was about 80% of the theoretical yield.

It is not intended to restrict the present invention to the foregoing examples which are given merely to demonstrate how these new compositions of matter may be prepared. Other steps and modifications may be employed. For example, instead of precipitating the reaction product with a nonsolvent, it is possible to recover the reaction product by distilling the solvent and unreacted liquid from the reaction product under reduced pressures at low temperatures, e.g. 0° C. The invention should only be limited by the appended claims in which it is intended to claim all of the novelty inherent in the invention as well as all of the modifications and equivalents coming within the scope and spirit of the invention.

What is claimed is:

1. Bis-hydrazinemonoborane lithium borohydride having the formula $LiH_{18}N_4B_3$.

2. A composition of matter consisting of solid bishydrazine lithium borohydride having the empirical formula $LiH_{12}N_4B$ and further characterized by having a density of 0.96 gm./cm.$^3$ and a melting point of 115° C.

3. Process for making bis-hydrazinemonoborane lithium borohydride which comprises reacting hydrazinemonoborane with lithium borohydride in an organic cyclic ether solvent at 0° C. to 50° C. and recovering the bis-hydrazinemonoborane product.

4. Process according to claim 3 in which the cyclic organic ether is tetrahydrofuran.

5. Process for making hydrazinated lithium borohydride which comprises reacting a compound selected from the group consisting of hydrazine and hydrazine monoborane with lithium borohydride in the presence of tetrahydrofuran solvent, and recovering the hydrazinated lithium borohydride product.

6. Process for making hydrazinated lithium borohydride which comprises reacting a compound selected from the group consisting of hydrazine and hydrazine monoborane with lithium borohydride in the presence of dihydropyran, and recovering the resulting hydrazinated lithium borohydride product.

7. Process for making and recovering bis-hydrazine lithium borohydride having the empirical formula $LiH_{12}N_4B$, which comprises the steps carried out in a dry inert atmosphere of dissolving lithium borohydride in an excess of liquid hydrazine at about 0° to 15° C. to obtain a solution of the lithium borohydride reacted with the hydrazine in excess liquid hydrazine, reacting a proportion of 2 moles of hydrazine with 1 mole of the lithium borohydride in the excess liquid hydrazine at about 0° to 15° C. by slow addition of the lithium borohydride, evaporating excess liquid hydrazine at about room temperature to form a thick liquid containing glassy crystals and freeing said crystals of remaining liquid hydrazine by vacuum drying to recover a white solid product having the empirical formula $LiH_{12}N_4B$, a density of about 0.96 gm./cm.$^3$ and a melting point of about 115° C.

References Cited

UNITED STATES PATENTS 2,545,633   3/1951   Schlesinger _____ 23—14

OTHER REFERENCES

Schechter et al., "Boron Hydrides and Relates Compounds," 2nd edition, pp. 6, 13, 44, 49, 50, 69, 70, 78, May 1954, declassified Jan. 6, 1958.

MILTON WEISSMAN *Primary Examiner.*

WILLIAM C. WILES, ROGER L. CAMPBELL, CARL D. QUARFORTH, *Examiners.*

R. D. MORRIS, R. L. GRUDZIECKI,
*Assistant Examiners.*